United States Patent [19]

Kurihara

[11] Patent Number: 5,524,214
[45] Date of Patent: Jun. 4, 1996

[54] SYSTEM FOR MODIFICATION OF DYNAMIC BUFFER ALLOCATION BY COMPARING MODIFICATION REQUEST WITH CURRENT ALLOCATION AND UPDATING ALLOCATION BASED UPON COMPARISON DISCREPANCY

[75] Inventor: Kenjiro Kurihara, Tokyo, Japan

[73] Assignee: NEC Corporation, Tokyo, Japan

[21] Appl. No.: 10,812

[22] Filed: Jan. 29, 1993

[30] Foreign Application Priority Data

Jan. 30, 1992 [JP] Japan .................................. 4-038420

[51] Int. Cl.⁶ ...................................................... G06F 5/06
[52] U.S. Cl. ............................................................ 395/250
[58] Field of Search ............................. 395/250; 370/60; 365/185

[56] References Cited

U.S. PATENT DOCUMENTS

| | | | |
|---|---|---|---|
| 4,603,382 | 7/1986 | Cole et al. ................................ | 395/250 |
| 4,763,305 | 8/1988 | Kuo ........................................... | 365/185 |
| 5,014,265 | 5/1991 | Hahne et al. ............................. | 370/60 |
| 5,046,039 | 9/1991 | Ugajin et al. ............................ | 395/250 |

OTHER PUBLICATIONS

Bhatia, S. "Performance Analysis of Congestion Management Schemes for Streams/Based Communication Systems", 14–17, May 91, pp. 986–991.

*Primary Examiner*—Richard L. Ellis
*Attorney, Agent, or Firm*—Foley & Lardner

[57] ABSTRACT

A dynamic buffer change system according to the present invention copies the initial values of the setting for the buffer areas constituting a class for each of the classes as divisions of a buffer region when the system is started up. Upon request to change the setting for the buffer areas in a class, the current setting for the buffer areas of the class is read from the class data region and compared with the requested setting. If, in the comparison by a change control means, any discrepancy is found, the setting for the buffer areas of the class is changed according to the setting requested. At the same time, the setting for the buffer areas in the class data region is also rewritten according to the requested setting.

8 Claims, 4 Drawing Sheets

SYSTEM FOR MODIFICATION OF DYNAMIC BUFFER ALLOCATION BY COMPARING MODIFICATION REQUEST WITH CURRENT ALLOCATION AND UPDATING ALLOCATION BASED UPON COMPARISON DISCREPANCY

BACKGROUNDS OF THE INVENTION

1. Field of the Invention

The present invention relates to a dynamic buffer change system which changes settings for a part of a buffer region divided into a plurality of parts or classes, each of which comprises a plurality of unit buffer areas, and in particular relates to a dynamic buffer change system which dynamically changes settings for the applicable buffer areas of a class in the buffer region upon change request input from a terminal during system operation.

2. Description of the Prior Art

Conventionally, a data base system utilizes a buffer region for temporary data storage in data input/output for the files constituting the data base when provided with a plurality of terminals.

Such a buffer region is usually divided into a plurality of classes for different applications. A class of a buffer area consists of a plurality of unit buffer areas. Data are actually input/output using such buffer areas of each class as units. Buffer areas, which are secured for each class, are conventionally allotted with referring to the initial system setting region which contains the setting for the buffer areas of each class at the time of system activation. In other words, when the system is booted up, it refers to the initial system setting region for each class so that the specified number of buffer areas of specified sizes are secured in the buffer region. These buffer areas for different classes secured in the buffer region are controlled according to the setting contained in the above initial system setting region.

The conventional method to secure buffer areas of the classes as described above merely has buffer areas for the specified number allotted for each class by referring to the initial system setting region when the system is booted up.

The settings for the buffer areas for each class stored in the initial system setting region are set before system activation and cannot be rewritten after starting up of the system. Accordingly, any change in the number or sizes of buffer areas for a class secured in the buffer region will cause a discrepancy between actual arrangement of the buffer areas for the classes and the setting for the buffer areas in the classes given in the initial system setting region, which disables control of the buffer areas in the classes based on the data in the initial system setting region. Thus, it is practically impossible to dynamically change the settings for the buffer areas in the classes.

Specifically, for a conventional system, the setting for the buffer areas of the classes in the buffer region is fixed when the system is started up and such setting cannot be changed. If the necessary class buffer volume changes depending on the task type and time after starting up of the system, the buffer volume may be insufficient for a class used for a task but may be in excess for another class used for another task. With such a system, the buffer region cannot be used effectively.

SUMMARY OF THE INVENTION

It is an object of the present invention to provide a dynamic buffer change system which can dynamically change the setting for the buffer areas constituting the classes according to the situation of use for the classes in the buffer region during system operation, and thereby enables highly effective use of the buffer region.

According to a preferred embodiment of the present invention to attain the above object, a dynamic buffer change system for an information processing system which uses a buffer region as a temporary storage for input or output of data to or from other storages comprises a buffer region divided into a plurality of classes each of which consists of a plurality of unit buffer areas where data can be input and output separately for each class. There is an initial setting region to store the initial setting values for the buffer areas constituting a class for each of the classes as divisions of the buffer region, and a reloadable class data region which copies the contents of the initial setting region when the system starts up. Also provided are a change control means which, upon request to change the setting for the buffer areas of a class, reads the current setting for the buffer areas of the applicable class from the class data region so as to compare it with the requested setting, a buffer area setting change means which, if any discrepancy is found in comparison by the change control means, changes the setting for the buffer areas of the class according to the requested setting and a setting data according means which, if any discrepancy is found in comparison by the change control means, changes the setting for the buffer areas of the class in the class data region according to the requested setting.

According to a further preferred embodiment, a dynamic buffer change system further comprises a copy means to automatically copy the contents in the initial setting region to the class data region when the system is started up and a retrieval means to read the setting for the buffer areas for each class for which any change is requested in the class data region to the change control means.

According to a still preferred embodiment, a dynamic buffer change system further comprises a class buffer securing means which secures the buffer areas for each class in the buffer region according to the setting in the class data region, and the setting for the buffer areas comprises the sizes and the number of the buffer areas.

According to another preferred embodiment, the change control means of a dynamic buffer change system compares, upon change request, the current setting for the buffer areas for the class to be changed read from the class data region with the requested setting and performs no change processing when they are the same but activates the buffer area setting change means and the setting data according means when they are different from each other.

According to still another preferred embodiment, the change control means of a dynamic buffer change system compares, upon change request, the current setting for the buffer areas of the class to be changed read from the class data region with the requested setting and performs no change processing if they are the same but, if they are different from each other, further judges whether the classes to be changed have been already secured in the buffer region and activates the buffer area setting change means and the setting data according means when they have been secured or the setting data according means alone when they have not been secured.

Other objects, characteristics and effects of the present invention will be clarified in detailed description below.

DESCRIPTION OF THE PREFERRED EMBODIMENT

Referring to the attached figures, a preferred embodiment of the present invention will be described in detail below.

Figure 1:
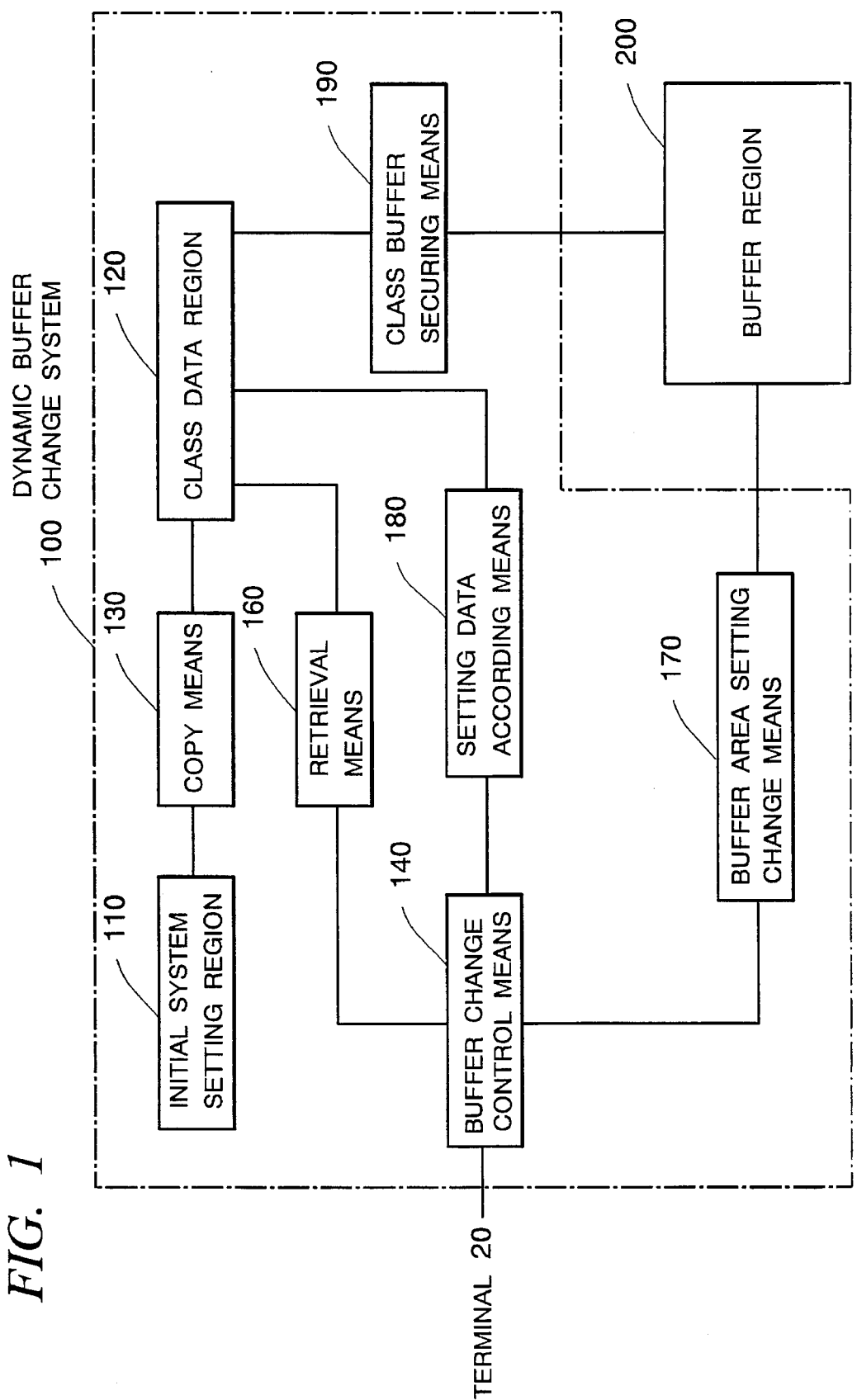
FIG. 1 is a block diagram to show the configuration of a dynamic buffer change system according to a preferred embodiment of the present invention.
Figure 2:
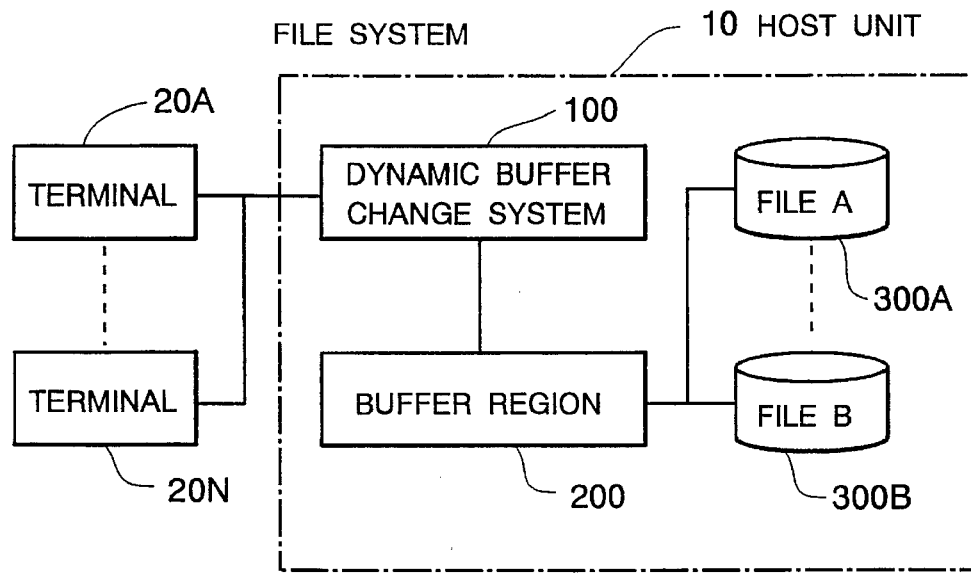
FIG. 2 is a block diagram to show the configuration outline of a file system using a dynamic buffer change system of the present invention.

FIG. 1 is a block diagram showing the configuration of a dynamic buffer change system according to a preferred embodiment of the present invention. FIG. 2 shows the outline of a file system where the dynamic buffer change system of the present invention is applied.

Firstly, referring to FIG. 2, the outline of a file system which adopts the present invention is described. In the figure, a file system has a host unit 10, which serves as a data base, for example, comprising a plurality of files 300A to 300B, which consist of external storages or other similar devices. Data of this host unit 10 are input from or output to a plurality of terminals 20A to 20N.

Figure 3:
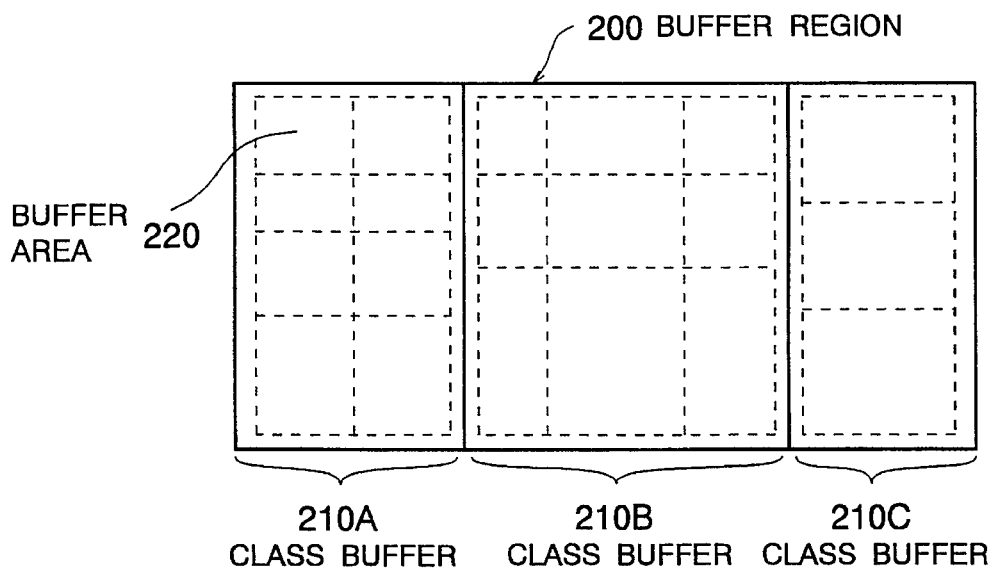
FIG. 3 is a diagram to show an example of a buffer region configuration.

The host unit 10 is provided with a buffer region 200 shown in FIG. 3 to temporarily store the data input to or output from the files 300A to 300B by the terminals 20A to 20N. It is also provided with a dynamic buffer change system 100, which characterizes the present invention.

The buffer region 200 of the host unit 10 is divided into a plurality of sections referred to as class buffers 210A, 210B, etc. to 210N. Data are input or output separately for each of the N class buffer. FIG. 3 shows a configuration example of the buffer region 200. As shown in the figure, the buffer region 200 is divided into three class buffers 210A, 210B and 210C. Input and output of data are controlled for each of these class buffers 210A, 210B and 210C. Specifically, the class buffers 210A, 210B and 210C are assigned to each of the terminals 20A to 20N or each of the files 300A to 300N for the purpose of data input/output.

The number of class buffers made in the buffer region 200 and the sizes of the class buffers are decided corresponding to the type and the number of files 300A to 300N in the host unit 10 and the type (application) of the user programs activated on the terminals 20A to 20N, for example.

Suppose three files 300A, 300B and 300C in the host unit 10 are accessed by three terminals 20A, 20B and 20C via the buffer region 200 having the configuration given in FIG. 3. In this case, the data for the files 300A, 300B and 300C are input or output via the class buffers 210A, 210B and 210C in the buffer region 200 respectively, for example. If the class buffers are assigned to the terminals 20A to 20C, the terminal 20A uses the class buffer 210A, the terminal 20B uses the class buffer 210B and the terminal 20C uses the class buffer 210C, for example.

The class buffers 210A to 210C in the buffer area 200 comprises, as shown in FIG. 3, a plurality of unit areas referred to as buffer areas 220. The buffer areas 220 are classified into some types according to their sizes. For example, there are small sized buffer areas 220 having 512 bytes or 1 kilobyte and large sized buffer areas 220 having 32 kilobytes.

A class buffer 210 may comprise a plurality of buffer areas 220 having different sizes. For example, a class buffer 210 may have twenty buffer areas consisting of ten buffer areas 220 of 512 bytes and ten buffer areas 220 of 2 kilobytes. Alternatively, all buffer areas 220 in a class buffer may be of the same size. In actual input and output of data for class buffers 210 in the buffer region 200, a buffer area 220 as described above is used as a unit.

The dynamic buffer change system 100 of the present invention has, as shown in FIG. 1, an initial system setting region 110, a class data region 120, a copy means 130, a buffer change control means 140, a retrieval means 160, a buffer area setting change means 170, a setting data according means 180 and a class buffer securing means 190.

The initial system setting region 110 stores the sizes and the number of buffer areas 220 constituting the applicable class buffer for each of the class buffers 210A to 210N in the buffer region 200. When the system is started up, or when a terminal 20 actually inputs or outputs data, the class buffers 210A to 210N are secured in the buffer region 200 based on the contents in the initial system setting region 110.

The class data region 120 keeps the current setting for the buffer areas 220 in each of the class buffers 210 after starting up of the system. The setting comprises the sizes and the number of the buffer areas 220. The class data region 120 can be rewritten.

The copy means 130 copies the contents of the initial system setting region 110 to the class data region 120 when the file system is activated.

The buffer change control means 140, upon buffer change request from a terminal 20, checks the requested number of buffer areas 220 against the current number of buffer areas 220 in the class data region 120 so as to control the change of buffer area setting.

The retrieval means 160 is activated by the buffer change control means 140 and loads the setting for the buffer areas 220 in the class buffer 210 for which any change is requested from the class data region 120 to the buffer change control means 140.

The buffer area setting change means 170 actually changes the arrangement of the buffer areas 220 in the applicable class buffer 210 in the buffer region 200 under control of the buffer change control means 140.

The setting data according means 180, under control of the buffer change control means 140, rewrites the setting for the buffer areas 220 in the applicable class buffer 210 contained in the class data region 120 according to the contents requested from the terminal 20.

The class buffer securing means 190, based on the setting contained in the class data region 120, secures the class buffers 210 (with the buffer areas 220) in the buffer region 200. The class buffers 210 are secured by the class buffer securing means 190 in response to requests from terminals 20.

Next, referring to the flowcharts of FIGS. 4 and 5, the operation of the dynamic buffer change system 100 with the above configuration will be described below.

Figure 4:
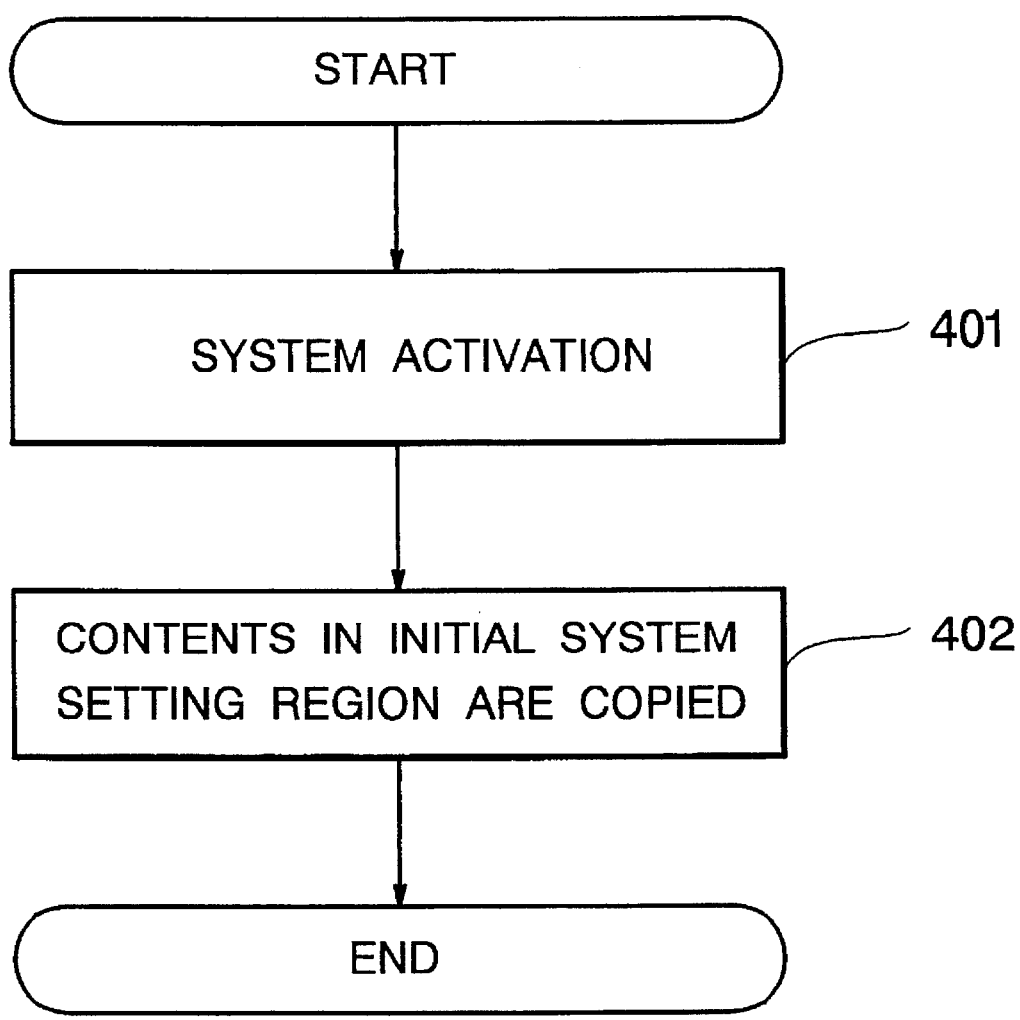
FIG. 4 is a flowchart to illustrate the processing when a dynamic buffer change system is started up.

FIG. 4 is a flowchart illustrating the operation when the file system is started up. When the file system is activated (Step 401), then the copy means 130 copies the contents stored in the initial system setting region 110 to the class data region 120 (Step 402). After that, according to the contents in the class data region 120, the class buffer securing means 190 secures the buffer region 200 as required. The class buffers 210 in the buffer region 200 may be secured automatically upon activation of the file system, or may be secured when a terminal 20 actually accesses a file 300.

Figure 5:
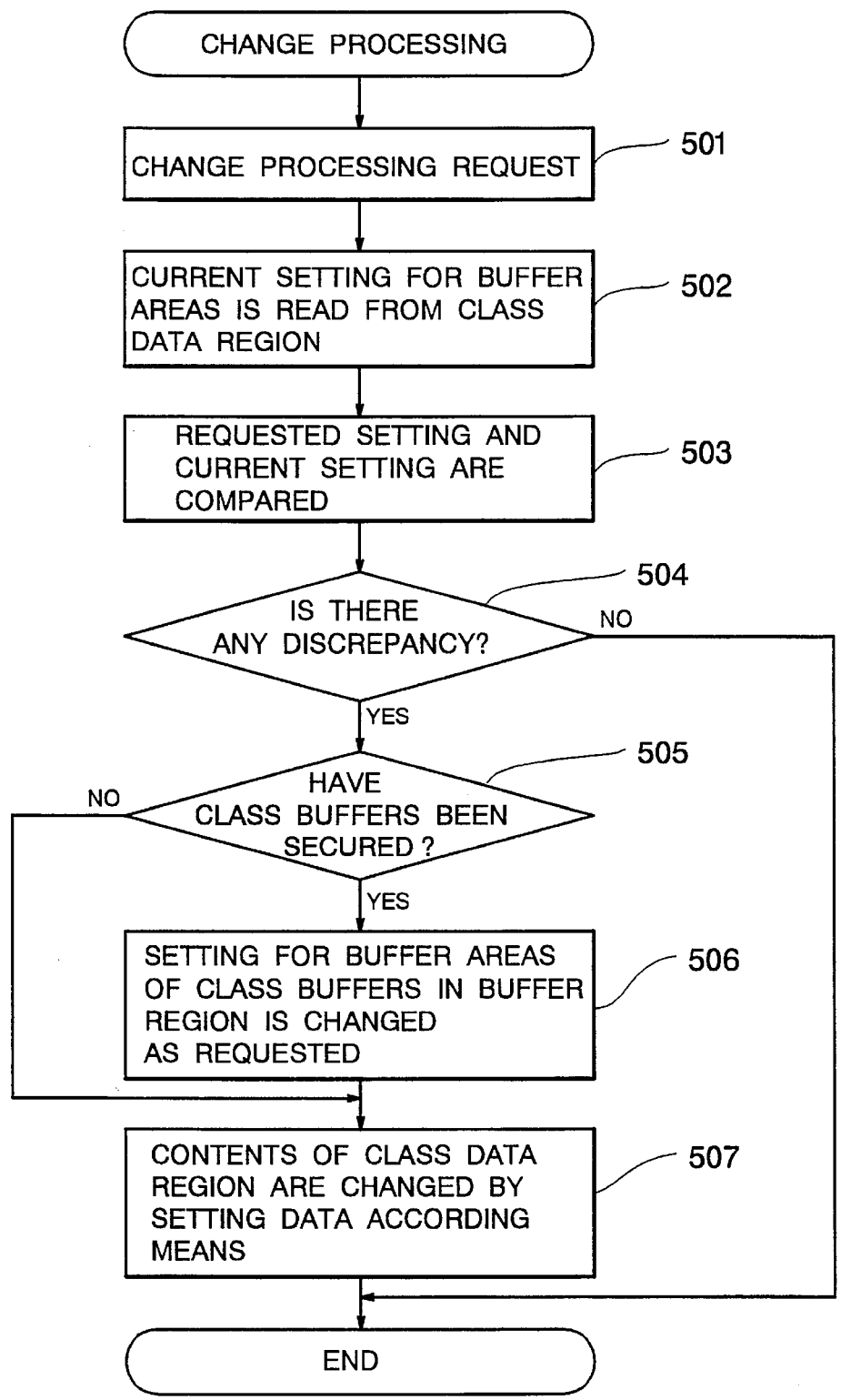
FIG. 5 is a flowchart to illustrate the processing to change the setting for the buffer areas with a dynamic buffer change system.

FIG. 5 is a flowchart illustrating the processing where the setting for the buffer areas 220 of the class buffers 210 in the buffer region 200 is changed by a terminal 20 after the activation of the file system.

When any change of setting for the buffer areas 220 in the class buffers 210 is requested from a terminal 20 to the buffer change control means 140 (Step 501), the buffer change control means 140 activates the retrieval means 160. The setting change request is executed for each of the class buffers 210. Upon such setting change request, the terminal 20 sends the requested setting for the buffer areas 220 in the class buffers 210 to the buffer change control means 140. The retrieval means 160 loads the current setting for the buffer areas 220 constituting the class buffers 210 to be changed in the buffer area 200 (sizes and the number of buffer areas) from the class data region 120 to the buffer change control means 140 (Step 502).

Then, the buffer change control means 140 compares the requested setting for the buffer areas 220 of the applicable class buffers 210 and the current setting for the buffer areas 220 loaded from the class data region 120 (Step 503) so as to judge whether there is any discrepancy or not (Step 504).

When they is no discrepancy, i.e. when the requested sizes and the number of the buffer areas 220 are equivalent to the current sizes and the number of the buffer areas 220, the procedure ends since there is no need of change processing.

When they have some difference between them, i.e. when the requested sizes and the number of the buffer areas 220 are larger or smaller than the current sizes and the number, the following steps are taken.

First of all, the buffer change control means 140 judges whether the class buffers 210 for the buffer region 200 have been already secured according to the class data region 120 (Step 505). If the class buffers 210 have been already secured, then the buffer change control means 140 activates the buffer area setting change means 170, which in turn changes the setting for the buffer areas 220 on the buffer region 200 according to the requested setting for the buffer areas 220 constituting the applicable class buffers 210 (the sizes and number of buffer areas 220) (Step 506). Thus, the sizes are changed for each of the class buffers 210.

When the change of buffer areas 220 ends, the buffer change control means 140 activates the setting data according means 180. The setting data according means 180 changes the setting contained in the class data region 120 for the buffer areas 220 of the class buffers 210 to a new setting requested by the terminal 20 (Step 507). Thus, the new arrangement for the buffer areas 220 of the class buffers 210 in the buffer region 200 is made identical to the setting contents stored in the class data region 120.

In Step 505, if the class buffer 210 to which the change is requested has not been secured, it is not necessary to change the class buffer 210 of the buffer region 200. Accordingly, the system skips Step 506 and proceeds to Step 507 in this case. If, after reloading of the class data region 120 in Step 507, the reloaded class buffer 210 is to be newly secured, then the buffer areas 220 are secured according to the new setting contained in the class data region 120.

Thus, with the dynamic buffer change system 100 according to this embodiment, even when the system is in operation, the setting for the buffer areas 220 in class buffers 210 can be dynamically changed as required. As a result, the setting of the class buffers (the number and sizes of the buffer areas 220) can be freely changed corresponding to various conditions such as the type of user program (application) activated on the terminal 20 or the time of use, which realizes effective buffer control.

Obviously, various modifications can be made to the above embodiment. For example, though the setting for the buffer areas are determined by their sizes and the number in the above embodiment, the setting may contain the number of the buffer areas alone if all the buffer areas have the same size. It is intended to cover in the appended claims all such variations and modifications as fall within the true spirit and scope of the present invention.

What is claimed is:

1. A dynamic buffer change system for an information processing system which uses a buffer region divided into a plurality of classes each of which consists of a plurality of buffer areas where data can be input and output separately for each class as a temporary storage for input or output of data between other storages, and a terminal, comprising:

an initial setting region for storing initial setting data indicating said buffer areas constituting a class for each of said classes as divisions of said buffer region;

a reloadable class data region which copies the initial setting data of said initial setting region upon starting of said information processing system;

a class buffer securing means for securing said buffer areas for each of said classes in said buffer region according to the setting in said class data region upon activation of said information processing system or access from said other storages;

a change control means, upon receiving from said terminal a request to change to a requested setting for said buffer areas of a class, for reading a current setting for said buffer areas of the class from said class data region and for comparing the current setting with said requested setting to determine a discrepancy;

a buffer area setting change means wherein, if the discrepancy is found in comparison by said change control means, for changing said setting for said buffer areas of the class according to said requested setting during operation of said information processing system; and a setting data according means wherein, if the discrepancy is found in comparison by said change control means, for changing the setting for said buffer areas of the class in said class data region according to said requested setting.

2. A dynamic buffer change system of claim 1, further comprising:

a copy means for automatically copying the contents in said initial setting region to said class data region when said information processing system is started up; and a retrieval means for reading the setting for said buffer areas for the class specified in the request to change in said class data region to said change control means.

3. A dynamic buffer change system of claim 1, further comprising a class buffer securing means, responsive to a request from said terminal, for securing said buffer areas for each class in said buffer region according to the setting in said class data region.

4. A dynamic buffer change system of claim 3 wherein said change control means compares, upon receiving said request to change, the current setting for the buffer areas of the classes to be changed read from said class data region with the requested setting and performs no change processing if said current setting and said requested setting are the same but, if said current setting and said requested setting are different, further judges whether the buffer areas for classes to be changed have been secured in said buffer region and activates said buffer area setting change means and said setting data according means when the buffer areas for the classes to be changed have been secured or activates said setting data according means alone when the buffer areas for the classes to be changed have not been secured.

5. A dynamic buffer change system of claim 1 wherein the setting for said buffer areas comprises the sizes and the number of said areas.

6. A dynamic buffer change system of claim 1 wherein said change control means compares, upon receiving said request to chance, the current setting for said buffer areas for the class to be changed read from said class data region with the requested setting and performs no change processing when said current setting and said requested setting are the same but activates said buffer area setting change means and said setting data according means when said current setting and said requested setting are different.

7. A dynamic buffer change system for an information processing system which uses a buffer region divided into a plurality of classes each of which consists of a plurality of buffer areas where data can be input and output separately for each class as a temporary storage for input or output of data between other storages and a terminal, comprising:

an initial setting region for storing initial setting data indicating said buffer areas constituting a class for each of said classes as divisions of said buffer region;

a reloadable class data region which copies the initial setting data of said initial setting region upon starting of said information processing system;

a class buffer securing means for securing said buffer areas for each of said classes in said buffer region according to the setting in said class data region upon activation of said information processing system or access from said other storages;

a change control means, upon receiving from said terminal a request to change to a requested setting for said buffer areas of a class, for reading a current setting for said buffer areas of the class from said class data region and for comparing the current setting with said requested setting to determine a discrepancy;

a buffer area setting change means wherein, if the discrepancy is found in comparison by said change control means, for changing said setting for said buffer areas of the class according to said requested setting during operation of said information processing system;

a setting data according means wherein, if the discrepancy is found in comparison by said change control means, for changing the setting for said buffer areas of the class in said class data region according to said requested setting;

a copy means for automatically copying the contents in said initial setting region to said class data region when said information processing system is started up; and a retrieval means for reading the setting for said buffer areas for the class of the request to change in said class data region to said change control means;

wherein said change control means, if the current setting and the requested setting are different, judges whether the classes to be changed have been secured in said buffer region and activates said buffer area setting change means and said setting data according means when the buffer areas for the classes to be changed have been secured and activates said setting data according means alone when the buffer areas for the classes to be changed have not been secured.

8. A dynamic buffer change system of claim 7 further comprising a class buffer securing means, responsive to a request from said terminal, for securing said buffer areas for each class in said buffer region according to the setting in said class data region.

* * * * *